Jan. 11, 1949. G. A. LYON Re. 23,075

WHEEL COVER

Original Filed Feb. 4, 1943

Inventor
GEORGE ALBERT LYON.

by Charles W. Helm Attys.

Reissued Jan. 11, 1949

Re. 23,075

UNITED STATES PATENT OFFICE 23,075

WHEEL COVER

George Albert Lyon, Allenhurst, N. J.

Original No. 2,386,225, dated October 9, 1945, Serial No. 474,647, February 4, 1943. Application for reissue August 29, 1946, Serial No. 693,603

14 Claims. (Cl. 301—37)

This invention relates to an improved wheel trim structure and is directed more particularly to a wheel construction in which the various appurtenances are more readily available for servicing and the like.

An important object of the invention is to provide a wheel cover member which is so constructed that the tire rim and the valve stem of the tire is effectively concealed yet which is so constructed that the rear side of the cover member together with the valve is accessible without requiring the removal of the cover member from the wheel.

Still another object of the invention is to provide a cover member in a wheel structure, with a wheel attaching arrangement which is so constructed that the cover member is maintained on a wheel member to which it is attached, under a condition of stress thereby to greatly increase the security of the attachment thereof to the wheel.

Still another object of the invention is to provide a novel wheel cover member constructed and arranged for attachment to a wheel member and so that the inner or rear face of the wheel cover member and those appurtenances on the part of the wheel which is covered are accessible by virtue of a simple and easy manipulation whereby a portion of the cover is temporarily, flexibly distorted to expose a part of the wheel to which the cover member is attached.

A further object of the invention is to provide an ornamental cover assembly for a wheel structure, the assembly including a central hub cap portion and an outer annular ring portion, the portions being so constructed and arranged that they may be removed from the wheel as a unit without separating one from the other.

A still further object of the invention is to provide a wheel cover assembly including an outer, locally flexible portion and a central hub cap portion, the latter cooperating with the outer portion to protect that portion from breakage during a pry-off operation.

In accordance with the general features of this invention there is provided in a wheel structure, an ornamental cover assembly which is disposable over the outer part of the wheel to cover the same together with the valve stem, the cover member including a part which is spaced from the wheel member and overlies a portion thereof in spaced relationship thereto, whereby a chamber or space is formed, this chamber or space being accessible by virtue of the flexing of the cover part relative to the wheel.

In accordance with other features of this invention, there is provided a wheel cover assembly which includes an annular trim ring disposed over the outer part of a tire rim and retained in attached relationship with the wheel, this trim ring being spaced from the wheel to conceal the tire valve and to afford a contiguous surface with the side wall of a tire in the tire rim, being provided with an orifice which is aligned with the valve stem projecting from the tire rim and being so constructed and arranged that it may be flexed or temporarily distorted relative to the tire rim to afford access to the valve stem for the connection of an air hose and to provide for the entry of a pry-off tool.

In accordance with still other features of this invention, there is provided herein a cover member which is secured to a wheel member under a condition of stress, this being accomplished by distorting the same slightly to attach it to the wheel, this slight distortion being retained throughout the attachment of the cover member.

In accordance with still further features of this invention, there is provided herein a circular wheel cover member including a radially outer ring portion and a central cover portion, said central cover portion having its peripheral marginal portion interengaged with the inner edge of the ring portion to provide a unitary assembly, the ring portion being constructed and arranged to be locally, manually deflectable to provide access between said ring portion and a wheel when the unitary wheel cover structure is mounted in place on the outer side of the wheel.

Other objects and features of this invention will more fully appear from the following detail description taken in connection with the accompanying drawing which illustrates a number of embodiments thereof and in which.

As shown on the drawing.

Figure 2:
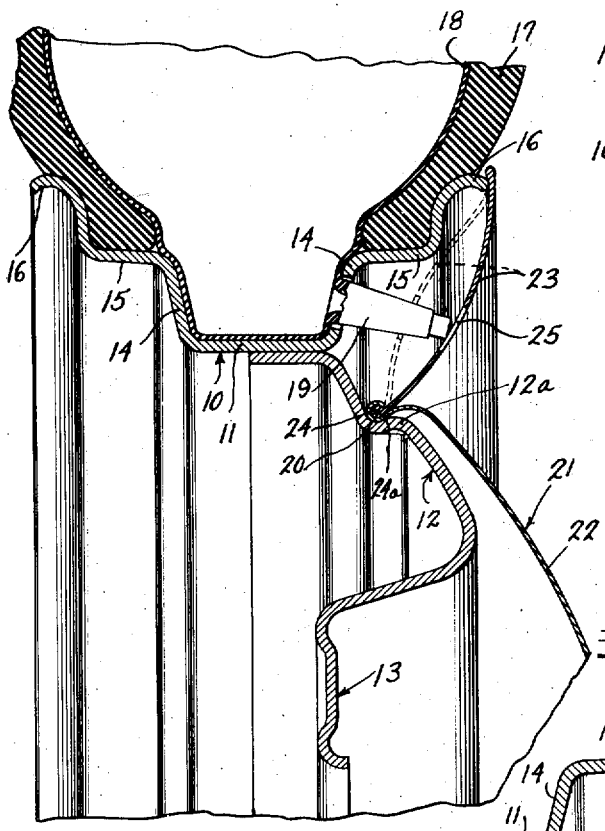
Figure 2 is a fragmentary cross section of an embodiment of my invention.

The reference character 10 designates generally a multi-flanged, drop-center type of tire rim which is connected as by riveting or welding or the like through a base flange 11 to a central body part or spider 12 which includes a central bolt-on flange 13. The drop-center rim 10 is further provided with opposite side flanges 14 opposite intermediate flanges 15 and opposite edge portions 16. A suitable tire 17 having an inner tube 18 and a valve stem 19 being mounted upon the rim, one of the sidewalls 14 having an orifice through which the valve stem 19 may project.

While many different expedients may be utilized as the cover attachment means, the body part 12 in the present instance is utilized. In the construction shown in Figure 2 the body part is so cross-sectionally configurated that there is provided a circular, radially outwardly facing groove 20 defined at its axially outer side by a radially outwardly protruding formation 12*a* affording a generally axially inwardly facing cover retaining shoulder into which the cover member may be snapped as will be explained presently.

As will be seen from Figure 2 wherein a cover member embodying the features of my invention is disclosed, the valve stem 19 projects a considerable distance from the outer surface of the respective sidewalls 14. As previously indicated it is desirable that the valve stem be concealed by the cover member but that it be readily accessible to provide for the inflation of a tire. It will be readily understood that if the cover member is to conceal the valve stem, it must be disposed in a plane outwardly of the outer end thereof. However the valve stem must at all times be accessible to provide for inflation of the tire and this accessibility preferably must be provided for without necessitating the removal of the concealing cover member every time the tire is inflated.

As will be seen from Figure 2 a cover assembly 21 is provided for the wheel member. In the embodiment of Figure 2 the cover member includes a central hub portion 22 and a radially outwardly disposed ring portion 23. In the present embodiment it is the ring portion 23 which is utilized to conceal the valve stem 19 and the outer part of the tire rim 10. Furthermore it will be noted that the ring 23 instead of extending sharply inwardly as has been the common practice in the past, is provided with such a transverse cross-sectional curvature that it presents a gradual curve extending from the extremity of the edge portion 16 radially inwardly to a point on the body part 12. Furthermore, as indicated previously, in order that the valve stem 19 be effectively concealed the ring 23 is disposed a considerable distance axially outwardly from the adjacent outer surface of the wheel member.

From Figure 2 it will be seen that the inner periphery of the trim ring 23 comprises a bead 24 around which the edge of the central crown or hub portion 22 may be turned in order to provide for a unitary structure. This junction of the parts of the cover member provides for secure attachment thereof to the body part 12 of the wheel assembly since it may be snapped over the circular rib 12*a* whereupon it comes to rest in the circular groove 20.

With the foregoing construction the desired ends, that is the concealment of the valve stem 19 and the entire outer side of the tire rim 10 are obtained. However, these advantages are accompanied by apparent inacessibility of the attachment assembly and the valve stem.

To the end that the foregoing construction may be utilized and yet the attachment means be accessible to a pry-off tool and so that the valve stem may be accessible without necessitating the removal of the concealing cover member the latter is constructed so that it may be flexed locally, particularly in the vicinity of the valve.

Figure 4:
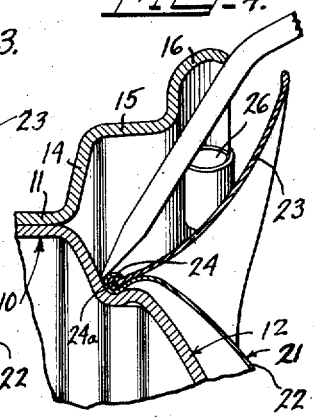
Figure 4 is a fragmentary cross-sectional view similar to Figure 3 showing the application of my invention in the removal of the cover member from the wheel assembly.

In the form of the invention shown in Figure 2 the trim ring 23 is provided with an orifice 25 which is aligned to register with the top of the valve stem when the cover member is attached. The ring 23 is constructed to flex whereby it may be distorted by finger pressure of the user both inwardly as indicated by the dotted lines in Figure 2 or outwardly as shown in Figure 4. In the event that the user merely desires to inflate the tire it is merely necessary to press the ring member 23 locally in the vicinity of the orifice 25 whereupon the top of the valve stem will protrude through the orifice and beyond the ring member and thus be available for attachment of an air hose. In the event that it is necessary to remove the cover assembly the user need merely engage the fingers over the protruding outer periphery of the ring 23 whereupon it can be drawn into the position shown in Figure 4 to provide for the insertion of a pry off tool as there shown. The latter manipulation will of course be utilized in the event that replacement or adjustment of wheel balancing weights 26 or the like is necessary.

In constructing the ring member 23 it is contemplated that thin flexible synthetic plastics, relatively heavy rubber or synthetic rubber or thin flexible steel will be utilized.

Another important aspect of the invention is the retention of the ring member 23 upon the wheel in such a manner that it securely engages the same and so that a degree of cross-sectional support will be afforded.

Figure 3:
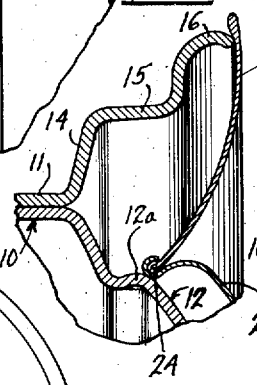
Figure 3 is an enlarged fragmentary cross section of the construction shown in Figure 2, the position of the cover member being shown just prior to its final attachment to the wheel assembly.
Figure 1:
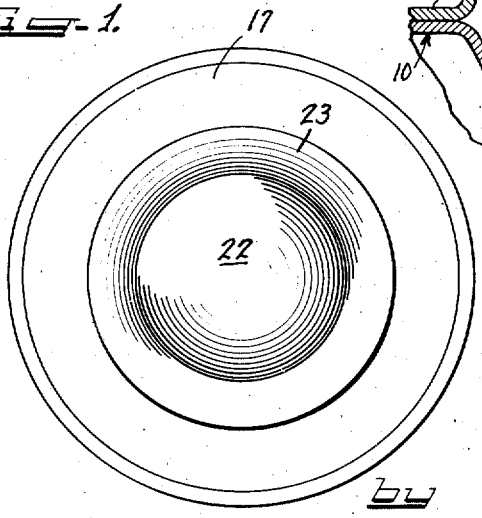
Figure 1 is a side elevation of a wheel assembly embodying my invention.

Broadly this is effected by slightly distorting the cover and particularly the ring 23 during the attachment operation and retaining this distorted condition after the attachment has been completed. As will be seen from Figure 3 which represents a partial attachment of the ring member 23, the latter has been placed against the wheel structure in a position in which the outer peripheral edge of the ring has engaged the axially outermost part of the edge portion 16 of the tire rim. In this position it will be seen that the junction of the hub or crown portion 22 with the ring 23 has not yet overridden the rib 12*a*. It will also be seen that further axially inward movement of the cover member from the position shown in Figure 3 will involve continued axially inward movement of the inner peripheral edge of the ring 23, that is the junction of the ring and the crown portion 22 while the outer periphery of the ring 23 continues to abut the edge portion 16 and thus is prevented from further inward movement. This being the case, further inward movement of the cover assembly will involve a distortion of the ring 23 which places it under stress, this condition of stress being maintained after the cover member is in its final position as shown in Figure 2. This condition of stress greatly increases the security of the attachment of the cover assembly to the wheel and further affords transverse support for the ring 23.

Figure 5:
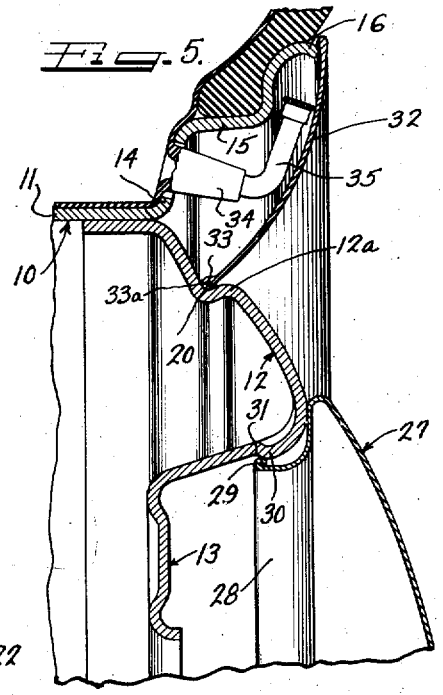
Figure 5 is a fragmentary cross-sectional view of a modified form of my invention.

In the embodiment shown in Figure 5 the crown portion 27 is provided with a radially inwardly extending flange 28 which terminates in an outwardly extending bead 29. The body part 12 of the wheel assembly is provided with a radially inwardly extending rib 30 and a radially inwardly facing groove 31 into which the bead 29 may be snapped after it has been pressed over the rib 30.

In Figure 5 the trim ring 32 is similar to the ring 23 of Figure 2 except that the orifice 25 is not provided and the inner enlarged periphery 33 thereof is not connected with the crown portion 27. In this construction the stressed attachment of the ring 23 is attained by forcing the inner peripheral edge 33 of the ring over the rib 12*a* and behind the retaining shoulder thereof, into the circular groove 20.

In the construction of Figure 5 the valve stem 34 also protrudes through the respective sidewall 14 of the tire rim 10 however in this construction it is contemplated that the valve will be made accessible by a manipulation such as that shown in Figure 4, that is, a removal of the edge of the flexible trim ring 32 away from the edge portion 16 of the rim. To this end the valve is provided with a radially outwardly extending elbow 35 which will be readily accessible for attachment of an air hose after the ring 32 has been flexed outwardly.

From the foregoing it will be seen that there is provided herein an improved and highly efficient cover member construction in which the valve stem is effectively concealed, the cover is of such configuration that it affords a contiguous trim with the sidewall of the tire thereby to be available to provide a white sidewall effect without the necessity of this feature being built into the tire and yet which, though it covers the tire rim up to the edge portion thereof, may be readily manipulated to provide access to the valve stem and to the rear of the cover member.

It should also be noted that in the several forms of my invention I have provided a stiffening or reenforcing outer ring 24*a*—33*a* which serves to stiffen the cover member at its place of retaining engagement with the wheel. This ring tends to hold the flange or bead in which it is disposed in a substantial circle and its rigidity enhances the retaining cooperation as between the cover member and the cooperating portion or shoulder on the wheel. The stiffening ring, however, does not interfere with the flexing of the wheel cover when it is desired to flex a portion of the same away from the wheel to afford access to the space therebehind for the purpose of getting at the valve stem, removing the cover or applying balancing weights underneath the cover to the tire rim.

It will also be perceived from the several illustrated and described forms of my invention that I have invented a wheel trim cover which is of such shallow depth and configuration that it can extend downwardly onto and over a portion of the wheel spider so that the ensuing wheel structure is caused to have the appearance of a massive tire extending substantially to the hub of the wheel. Thus, as noted before when this trim cover is painted or finished in white, such as an egg-white finish, it causes the wheel to appear to have a white side wall tire in which the white side terminates in close proximity to the hub cap of the wheel. This structure constitutes quite an improvement since it provides the car with the desired massive appearing tires and also enables an ornamental effect which is highly desirable and which is relatively economical to provide.

The depth of my wheel cover or rim is such that to get the foregoing effect, as shown in Figures 2 and 5, it is necessary to have the cover extend over the valve stem. This would not be practical if it were not for the structure I have provided for enabling access to the valve stem. In the illustrated embodiments of the invention I have provided for the accessibility to the valve stem by the use of a flexible wheel cover or trim ring.

What I claim is:

1. As an article of manufacture a wheel cover member including a ring portion of thin resiliently deflectable material and a central cover portion of relatively stronger material, said ring portion having an enlarged inner edge, said central portion having its peripheral marginal portion protectively embracing said enlarged edge of the ring portion to provide a unitary assembly, said peripheral marginal portion of the central cover portion being arranged for sliding under stress into retaining engagement with retaining means on an outer part of a wheel, said ring portion being constructed and arranged to be locally, manually deflectable to provide access between said ring and a wheel when said unitary structure is mounted on said outer part of the wheel.

2. In a wheel structure including a tire rim, a body part and a valve stem projecting outwardly from the rim, said body part being formed to provide a radially outwardly opening recess on its outer side, a circular wheel trim for disposition over an outer side of the rim to substantially conceal the valve stem, said trim being constructed and arranged to substantially cover the tire rim and the valve stem and to be locally flexed to provide access to the rear side thereof and having an inner peripheral edge arranged to be snapped into said recess to retain the wheel trim on said wheel.

3. In a cover structure for a wheel including a tire carrying rim part and a load bearing part having a generally axially inwardly facing cover retaining shoulder, a wheel cover member for disposition over an outer side of a wheel, said cover member being of such arcuate cross-sectional contour and of such width as to, when applied to the wheel, constitute in effect a continuation of the side wall of the tire on the wheel so as to give the appearance of being part of the tire, said cover member comprising an annulus supported solely by one of its edges being sprung over and behind said shoulder of the wheel and said cover member being made of such material that it may be manually flexed to dislodge it from its retained cooperation with the wheel and said cover member when in use on the wheel being manually deflectable without requiring disengagement of its edge from said shoulder but being returnable back of its own accord to its normal position on the wheel.

4. In a trim assembly, a central hub cap portion, a bead formed at the outer peripheral edge of said hub cap portion and an outer annular trim ring constructed and arranged to be locally flexed to allow access to the rear thereof, said bead on the hub cap portion having the inner peripheral edge of said annular trim ring retainingly bottomed therein, the junction of said hub cap portion and said trim ring constituting an attachment member adapted to engage in snap-on pry-off relationship with retaining means on a wheel structure when the assembly is mounted thereon.

5. In a trim assembly, a central hub cap portion and an outer annular trim ring constructed and arranged to be locally flexed to allow access to the rear side thereof, said hub cap portion having the outer peripheral margin thereof formed to provide a peripheral, radially outwardly turned and axially outwardly opening bead arranged to engage a wheel structure over which the hub cap is to be disposed in snap-on pry-off relationship, said annular trim ring having its inner peripheral edge disposed in bearing relation in the interior of said bead to be encompassed thereby.

6. In a wheel structure having a tire rim and means for receiving an ornamental cover member in snap-on pry-off engagement, a cover member including an outer resiliently and locally flexible ring member and an inner cover member, said inner member having a portion thereof constructed for snap-on pry-off attachment to said wheel structure and being formed to encompass and provide a bearing for a radially inner peripheral edge of said ring to constitute a unitary cover member and to protect the inner periphery of said ring member against damage during snap-on and pry-off operations.

7. The structure of claim 6 further characterized by the outer ring member having its inner edge backed up on both sides by said inner member to retain said edge against displacement as well as to reinforce the same.

8. As an article of manufacture, a wheel cover adapted to be mounted in covering relation to the outer side of a wheel which includes a tire rim and a load sustaining body part, separately formed inner and outer circular cover portions, said inner portion having its radially outer margin formed to provide a generally axially inwardly and radially inwardly extending flange, the inner margin of said outer cover portion being disposed in snug face to face relation with the outer face of said flange, and an outturned retaining and reinforcing bead on said flange protruding beyond said margin and effectual to lock said cover portions against separation, the united flange and margin cooperating to provide a multi-thickness attachment flange for the cover substantially reinforced by said bead and adapted to cooperate with attaching means on said wheel body in snap-on pry-off fashion.

9. In a wheel structure including a tire rim and a load sustaining body portion, a cover member for disposition over the outer side of the wheel structure including a radially outer annular cover member and a central circular hub cap member disposed concentrically relative to one another, said hub cap member having a generally axially and radially inwardly obliquely disposed marginal flange, said outer annular cover member being of a uniformly convex cross-sectional configuration generally simulative of a tire side wall curvature and extending from the outer edge of the tire rim curvingly inwardly in general simulation of a radially inward extension of the tire side wall to give the appearance of a massive tire on the wheel and entirely covering the tire rim and a part of said body portion, the inner margin of said outer annular cover member being in snug facewise engagement with the outer face of said hub cap member flange, a bead on said flange retainingly related to the inner edge of said outer annular cover member to lock the cover members against separation and reinforcing the multi-thickness flange structure formed by the combined flange and contiguous margin, and means on said body portion engageable with the reinforced multi-thickness flange structure for holding the composite cover in snap-on pry-off assembled relation with the wheel structure.

10. In a wheel cover adapted to be mounted in covering relation to the outer side of a wheel including cover retaining means, separately formed inner and outer circular cover portions, said inner portion being made of a material strongly resistant to damage from engagement with retaining means or pry-off tools, and having a generally axially inwardly extending outer marginal flange, said outer cover portion being made from a highly flexible resilient material so that it can be manually deflected to open it for pry-off tool access or the like therebehind and having its inner margin closely encircling said outer marginal flange, and an outturned retaining and reenforcing bead structure on the edge of said flange protruding protectively and lockingly axially rearwardly and radially outwardly beyond the inner marginal extremity of said outer cover portion to provide a bearing for the inner edge thereof and to maintain the cover portions in unitary assembly and affording means for engagement with said cover retaining means and for engagement by a pry-off tool in dislodging the cover from said retaining means.

11. In a wheel cover adapted to be mounted in covering relation to the outer side of a wheel including cover retaining means, separately formed circular cover members, one of said members having means for engagement with said retaining means and being formed with a generally radially and axially outwardly opening circular groove, the other cover member extending generally radially outwardly from said one cover member and being formed from plastic material and being substantially resiliently deflectable without permanent deformation, the radially inner margin of said plastic cover member being bottomed in and interlockingly engaged within said groove and the cover members being thereby connected into a unitary assembly.

12. In a wheel cover adapted to be mounted in covering relation to the outer side of a wheel including cover retaining means, separately formed circular cover members, one of said members having means for engagement with said retaining means and being formed with a generally radially and axially outwardly opening circular groove, the other cover member extending generally radially outwardly from said one cover member and being formed from plastic material and being substantially resiliently deflectable without permanent deformation, the radially inner margin of said plastic cover member being interlockingly engaged within said groove and the cover members being thereby connected into a unitary assembly, said radially inner margin including a generally radially extending and reenforcing structure implementing the interlocked relationship within said groove and bearing snugly therein.

13. In a wheel trim assembly, an outer trim ring member of flexible material adapted to be locally flexed to allow access to the rear side thereof, an inner circular cover member of relatively stiffer and stronger material, said inner cover member being retainingly engageable with a vehicle wheel for retaining the assembly on the wheel and having an angular generally outwardly opening groove formation, the inner margin of the trim ring being formed as an enlarged bead having bearing relation within the groove formation of the inner cover member.

14. In a wheel trim assembly, an outer trim ring member of flexible material, an inner circular cover member of relatively stiffer and stronger material having a generally radially and axially inward'y extending flange terminating in an annular generally outwardly opening groove formation, and said trim ring member having its inner margin retainingly bottomed in said groove formation.

GEORGE ALBERT LYON.

REFERENCES CITED

The following references are of record in the file of this patent:

UNITED STATES PATENTS

| Number | Name | Date |
|---|---|---|
| 1,948,273 | Lyon | Feb. 20, 1934 |
| 1,968,076 | Lyon | July 31, 1934 |
| 2,148,995 | Nelson | Feb. 28, 1939 |
| 2,190,669 | Lyon | Feb. 20, 1940 |
| 2,199,888 | Lyon | May 7, 1940 |
| 2,244,913 | Lyon | June 10, 1941 |
| 2,368,254 | Lyon | Jan. 30, 1945 |